United States Patent [19]
Mochizuki

[11] Patent Number: 6,038,247
[45] Date of Patent: Mar. 14, 2000

[54] GRAPHITIZING ELECTRIC FURNACE

[75] Inventor: Chitoshi Mochizuki, Yokohama, Japan

[73] Assignee: Ishikawajima-Harima Jukogyo Kabushiki Kaisha, Tokyo-to, Japan

[21] Appl. No.: 09/089,354

[22] Filed: Jun. 3, 1998

[30] Foreign Application Priority Data

| Jun. 5, 1997 | [JP] | Japan | 9-147781 |
| May 7, 1998 | [JP] | Japan | 10-124794 |

[51] Int. Cl.[7] .................................................. H05B 3/60
[52] U.S. Cl. ................................. 373/120; 373/3; 373/5; 373/116; 373/135
[58] Field of Search .................................. 373/2, 3, 109, 373/110, 115, 120, 122, 123, 130, 135; 204/173; 423/445 B; 432/126; 201/6; 252/420; 502/5

[56] References Cited

U.S. PATENT DOCUMENTS

| 913,888 | 3/1909 | Heroult | 373/120 |
| 1,044,957 | 11/1912 | Washburn | 373/120 |
| 1,129,513 | 2/1915 | Peacock | 373/115 |
| 1,344,153 | 6/1920 | Shoeld | 373/120 |
| 4,001,487 | 1/1977 | Schumacher et al. | 373/120 |
| 4,261,857 | 4/1981 | Nakao | 252/420 |
| 4,867,848 | 9/1989 | Cordier et al. | 201/6 |
| 5,626,249 | 5/1997 | Tylko | 21/121.59 |

FOREIGN PATENT DOCUMENTS

| 0 311 538 | 4/1989 | European Pat. Off. . |
| 0 610 704 | 8/1994 | European Pat. Off. . |
| 921 337 | 5/1947 | France . |
| 2 293 681 | 7/1976 | France . |
| 628 168 | 10/1987 | France . |
| 550 053 | 5/1932 | Germany . |
| 2 185 559 | 7/1987 | United Kingdom . |

OTHER PUBLICATIONS

Patent Abstracts of Japan, vol. 015, No. 436 (C–0882), Nov. 7, 1991, JP 03 183607, Aug. 9, 1991.
Patent Abstracts of Japan, vol. 015, No. 436 (C–0882), Nov. 7, 1991, JP 03 183608, Aug. 9, 1991.
Patent Abstracts of Japan, vol. 015, No. 256 (C–0845), Jun. 28, 1991, JP 03 083809, Apr. 9, 1991.

Primary Examiner—Tu Ba Hoang
Attorney, Agent, or Firm—Oblon, Spivak, McClelland, Maier & Neustadt, P.C.

[57] ABSTRACT

A carbon powder inlet and a graphite powder collecting are oppositely arrange on a furnace body. At least a pair of electrodes are oppositely arranged in the furnace body with respect to a graphitizing area at an intermediate position between the inlet and the collecting port and are engaged with different timing.

3 Claims, 4 Drawing Sheets

GRAPHITIZING ELECTRIC FURNACE

BACKGROUND OF THE INVENTION

1. Field of the Invention

The present invention relates to a graphitizing electric furnace.

2. Discussion of the Background

Conventionally, artificial graphite powder has been industrially produced by graphitizing carbon powder through heat treatment under inert atmosphere at temperature of about 3,000° C. or more.

In the production of the graphite powder of this type, a graphitizing electric furnace such as an Acheson furnace has been used wherein carbon powder is graphitized by Joule's heat through direct supply of electric current to the carbon powder. Generally, existing graphitizing electric furnaces are designed to produce graphite powder in batch type production, resulting in low productivity. Therefore, there have been strong demands for development of a graphitizing electric furnace capable of continuously producing graphite powder by heat treatment of the carbon powder.

However, most of the continuous graphitizing electric furnaces as currently proposed are based on a design concept that carbon powder is charged into a space between a pair of graphite electrodes and electric current is supplied to the space while the carbon powder is moving, thereby heating the carbon powder by Joule's heat. The graphite electrodes themselves are also heated by Joule's heat to be positively utilized as heaters for maintaining the temperature inside the furnace to about 3,000° C. or more so as to continuously graphitize the carbon powder, which will inevitably result in sublimation and wear of the graphite electrodes since they are exposed to temperature as high as about 3,000° C. or more. Wear of the graphite electrodes has been and is a great obstacle to practical realization of continuous graphitizing electric furnaces.

To put it concretely, for example, a continuous graphitizing electric furnace is considered, in which a pair of graphite electrodes in the form of pipe is oppositely arranged in the furnace body, and a pair of which is to be as a carbon powder inlet and a graphite powder collecting port. In such a graphitizing electric furnace, when a carbon powder is charged in the furnace body and electric current is supplied to a space between pair of graphite electrodes from current source, the graphite electrodes themselves are heated to be functioned as heaters, the carbon powder, inside and at the center of the graphite electrodes, is graphitized to be heated by Joule's heat. Therefore, it has been thought that the graphite powder may be continuously produced by collecting the graphite powder through the one side of the graphite electrode pipe while new carbon powder is charged through the other side of it into the furnace body. Especially, it has been thought that the one side of the graphite elctrode pipe collecting the high-temperature graphite powder cannot bear to be used in long time since it is always disposed to high temperature and is easily sublimated.

SUMMARY OF THE INVENTION

To solve the above and other problems, it is an object of the present invention to provide a graphitizing electric furnace with high practicability which enables continuous production of graphite powder by heating the carbon powder to high temperature without use of the graphite electrodes.

The graphitizing electric furnace according to the invention comprises a furnace body, a carbon powder inlet and a graphite powder collecting port oppositely arranged on the furnace body and at least a pair of electrodes oppositely arranged in the furnace body with respect to a graphitizing area at an intermediate position between said inlet and said collecting port.

Thus, in the invention, electric energization of the electrodes in the furnace body into which the carbon powder is charged through the inlet will cause an axial zone including the graphitizing area between the electrodes to be heated by Joule's heat while the surrounding carbon powder adjacent to a wall of the furnace body is maintained at sufficiently low temperature by, for example, natural air-cooling. As a result, the carbon powder in the furnace body only at the graphitizing area is locally heated to high temperature and is graphitized. Thus, continuous production of graphite powder can be practically attained by collecting the graphite powder through the collecting port while new carbon powder is charged through the inlet.

In this case, the carbon powder at the graphitizing area is graphitized through heating by Joule's heat generated by the electric energization or supply of electric current. The carbon powder surrounding and enclosing the flow of the carbon and/or graphite powder from the inlet to the collecting port remains inside the furnace body. That is, the carbon powder at a core of the furnace body is graphitized while the surrounding carbon powder adjacent to the turnace wall serves as a heat insulator to the furnace body. As a result, the graphitizing area is properly maintained at high temperature. No impurities can intrude into the graphite powder to be collected through the collecting port and only the pure graphite powder can be properly collected since no materials exist in the furnace body 1 other than the carbon powder as raw material. The carbon powder adjacent to the furnace wall and surrounding the electrodes is maintained at low temperature and does not move, which makes it possible to alleviate burning damage of and improve durability of the furnace body and the electrodes.

Further, in the invention, a plurality of pairs of electrodes may be arranged in the furnace body oppositely with respect to the graphitizing area and electric current may be supplied to the respective pairs of electrodes one after another at different timing. Such electric energization of the respective pairs of electrodes one after another at different timing will cause the electric current flowing between each pair of electrodes to always pass through the graphitizing area, so that the graphitizing area has higher current density than that of the surrounding carbon powder and therefore has increased heating value by Joule's heat, which far facilitates local heating of only the graphitizing area at high temperature and designing of the furnace body compact in size. This effect can be furthermore reinforced since the graphitized powder has lower volume resistivity.

In the invention, the furnace body may have a barrel in the form of cylinder. The carbon powder inlet and graphite powder collecting port may be centrally arranged on the top and bottom of the furnace body, respectively. The respective pairs of electrodes may be placed in an annular arrangement on the inner wall of the furnace body so that each paired electrodes are arranged to be diametrically opposite of the barrel.

For electric energization of the respective pairs of electrodes one after another with different timing, preferably, a current controller is provided which connects the respective pairs of electrodes to the power supply one after another with different timing.

Furthermore, the furnace body may be designed as a water-cooled structure. Also, dual baffle means may be arranged at each of the inlet and the collecting port to define an intermediate chamber which may be converted into inert gas atmosphere or vacuumized.

Embodiments of the invention will be described in conjunction with the attached drawings.

DESCRIPTION OF THE PREFERRED EMBODIMENTS

Figure 1:
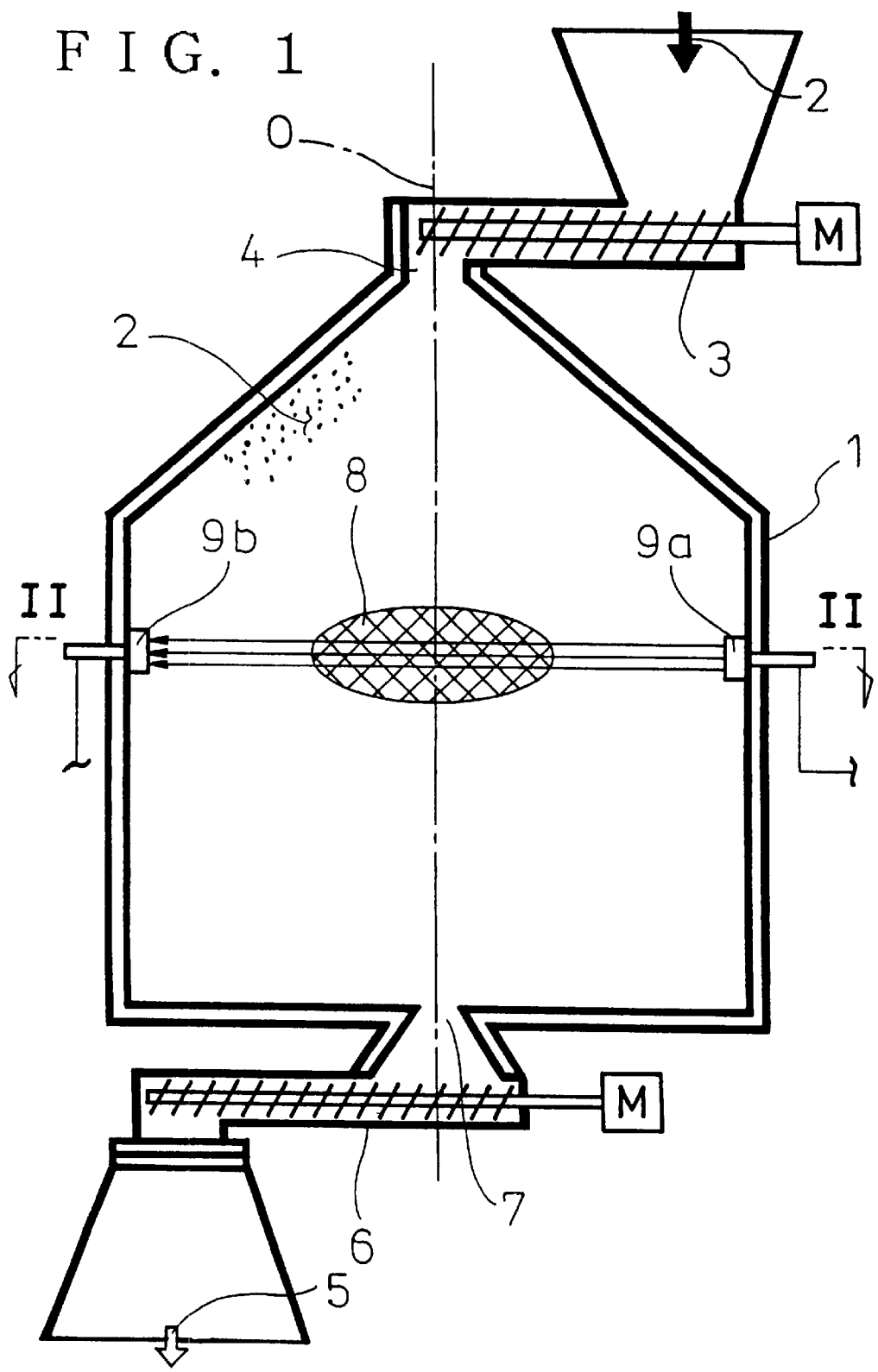
FIG. 1 is a sectional view of an embodiment according to the invention.
Figure 2:
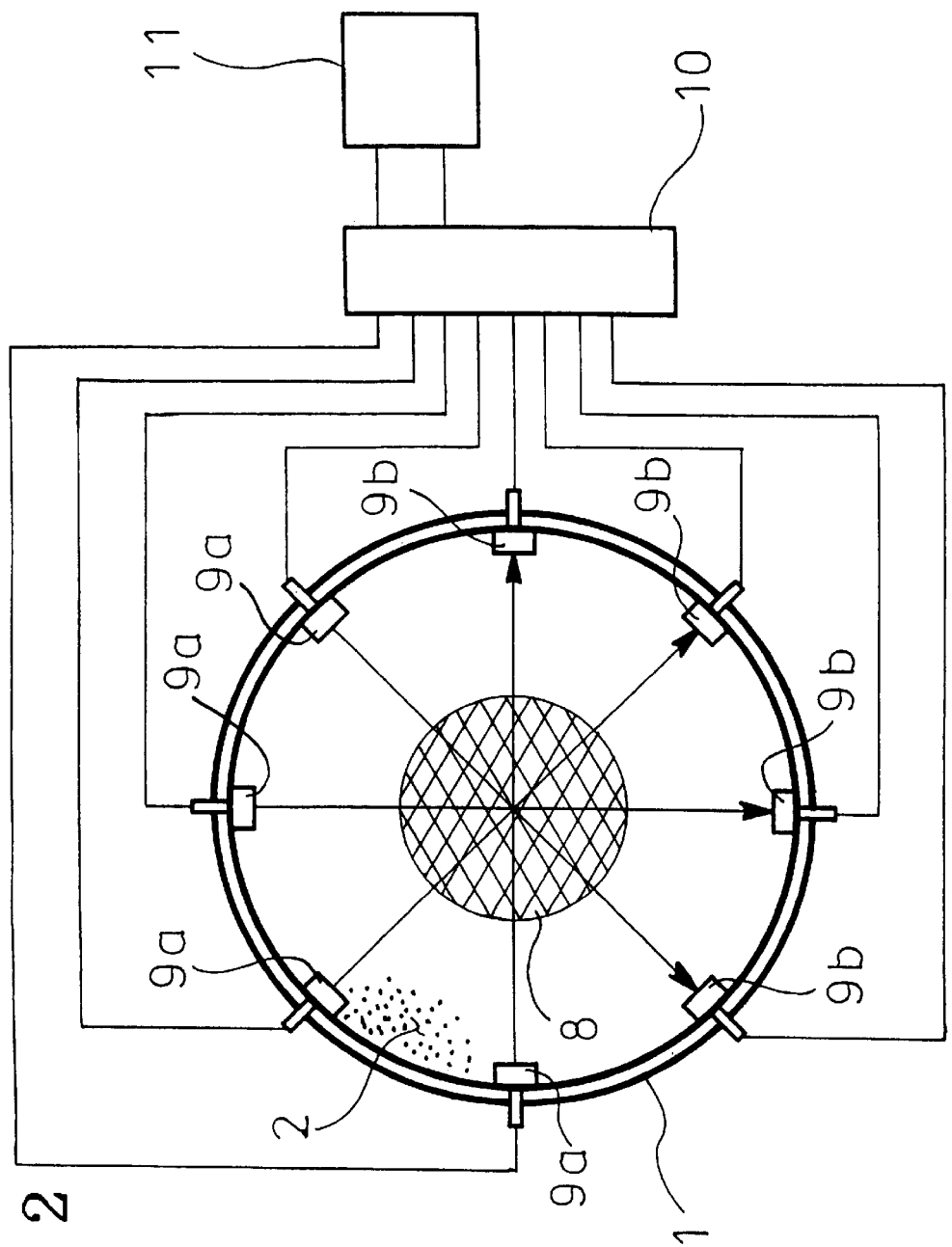
FIG. 2 is a cross-sectional view taken in the direction of arrows II—II in FIG. 1.

FIGS. 1 and 2 represent an embodiment of the invention in which reference numeral 1 represents a furnace body designed in water-cooled structure. The furnace body 1 has a carbon powder inlet 4 centrally at a top of the furnace body 1 so that carbon powder 2 may be charged into the furnace via, for example, a screw conveyor 3. The furnace body 1 has a graphite powder collecting port 7 positioned centrally at a bottom of the furnace body 1 so that graphite powder 5 obtained in heat treatment by graphitization of the carbon powder 2 may be collected via a screw conveyor 6. The furnace body 1 is filled with argon or other inert gas atmosphere or is vacuumized to be shut off from external atmosphere.

The furnace body 1 as shown is constituted by a cylindrical barrel topped with a cone and having an axis O on which the inlet 4 and the port 7 are arranged. The furnace body 1 has a bottom in the form of a flat disk.

The water-cooled structure for the furnace body 1 may be conventional in the art. More specifically, a wall of the furnace body 1 may be in the form of water-cooling jacket or may have a plurality of flow passages to circulate cooling water in the jacket or in the passages.

Furthermore, According to the embodiment, a graphitizing area 8 (cross-hatched area in the figures) is provided at an intermediate position in the furnace body 1 between the inlet 4 and the port 7. The furnace body 1 is provided, on its inner wall, with pairs of electrodes 9a and 9b in annular arrangement and made of copper or other conductive material at the same level as that of the graphitizing area 8. Each pair of electrodes 9a and 9b are diametrically opposed with respect to the graphitizing area 8 and are connected via an electric current controller 10 to a power supply 11 such that electric current may be supplied to the respective pairs of electrodes one after another with different timing.

It is needless to say that inside wall surfaces of the furnace body 1 adjacent to the electrodes 9a and 9b must be electrically insulated and that the wall of the furnace body 1 which contacts the carbon powder must be made of ceramics, hard plastics or other insulating materials. The power source 11 may be AC or DC power source.

Carbon powder 2 is charged into the furnace body 1 through the carbon powder inlet 4, and the respective pairs of electrodes 9a and 9b are energized one after another with different timing by the power source 11 via the current controller 10. Particularly as shown in FIG. 2, electric current flowing between the respective pairs of electrodes 9a and 9b passes mainly through the graphitizing area 8 with lower volume resistivity, so that the graphitizing area 8 has higher current density than that of the surrounding carbon powder and therefore has increased heating value by Joule's heat. On the other hand, the furnace body 1 itself has decreased temperature on and adjacent to its wall since it is water-cooled as a result, the carbon powder 2 in the furnace body 1 only at the graphitizing area 8 is locally heated to high temperature and is graphitized.

Thus, the graphite powder 5 may be continuously produced by collecting the graphite powder 5 graphitized at the graphitizing area 8 through the collecting port 7 while new carbon powder 2 is charged through the inlet 4 into the turnace body 1.

In this case, the carbon powder 2 at the graphitizing area 8 is graphitized through heating by Joule's heat generated by electric energization; the carbon powder 2 surrounding and enclosing the flow of the carbon and/or graphite powder 2 and/or 5 from the inlet 4 to the collecting port 7 remains inside the furnace body 1. That is, the carbon powder at a core of the furnace body is graphitized while the surrounding carbon powder adjacent to the furnace wall serves as a heat insulator to the furnace body 1. As a result, the graphitizing area 8 is properly maintained at a high temperature while the inner wall of the furnace body 1 is maintained at a low temperature. No impurities can intrude into the graphite powder 5 to be collected through the collecting port 7 since no materials exist in the furnace body 1 other than the carbon powder as raw material; only the pure graphite powder 5 can be collected at a position where the graphite power has a lowered temperature. Also, burning damage of the furnace body 1 and the electrodes 9a and 9b can be alleviated to improve durability of the furnace body 1 and the electrodes 9a and 9b.

According to this embodiment, the carbon powder 2 can be well heated at high a temperature by the usual electrodes 9a and 9b made of copper or the like material since the temperature inside the furnace body at the level of the electrodes can be maintained to lower value. Thus, there is no need of worrying about wear of graphite electrodes; and burning damage of the furnace body 1 and the electrodes 9a and 9b can be alleviated to improve durability of the furnace body 1 and the electrodes 9a and 9b. These make it possible to practically realize a graphitizing electric furnace which can continuously produce the graphite powder 5 by heat treatment of carbon powder 2.

No impurities can intrude into the graphite powder 5 which is to be collected through the collecting port 7 and only the pure graphite powder 5 can be collected, which makes it possible to extensively improve stability in quality of the graphite powder 5 produced.

Figure 3:
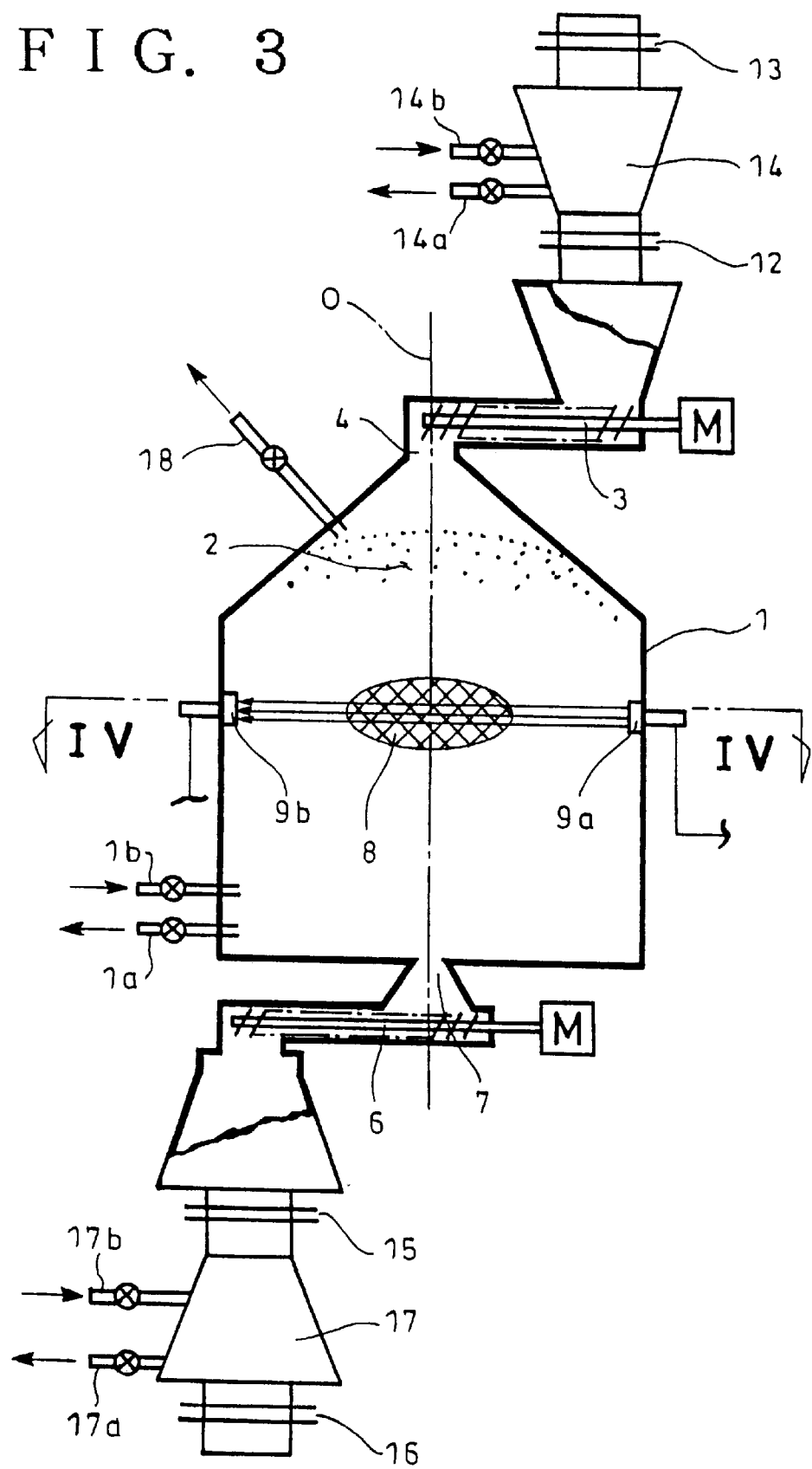
FIG. 3 is a sectional view of another embodiment according to the invention.
Figure 4:
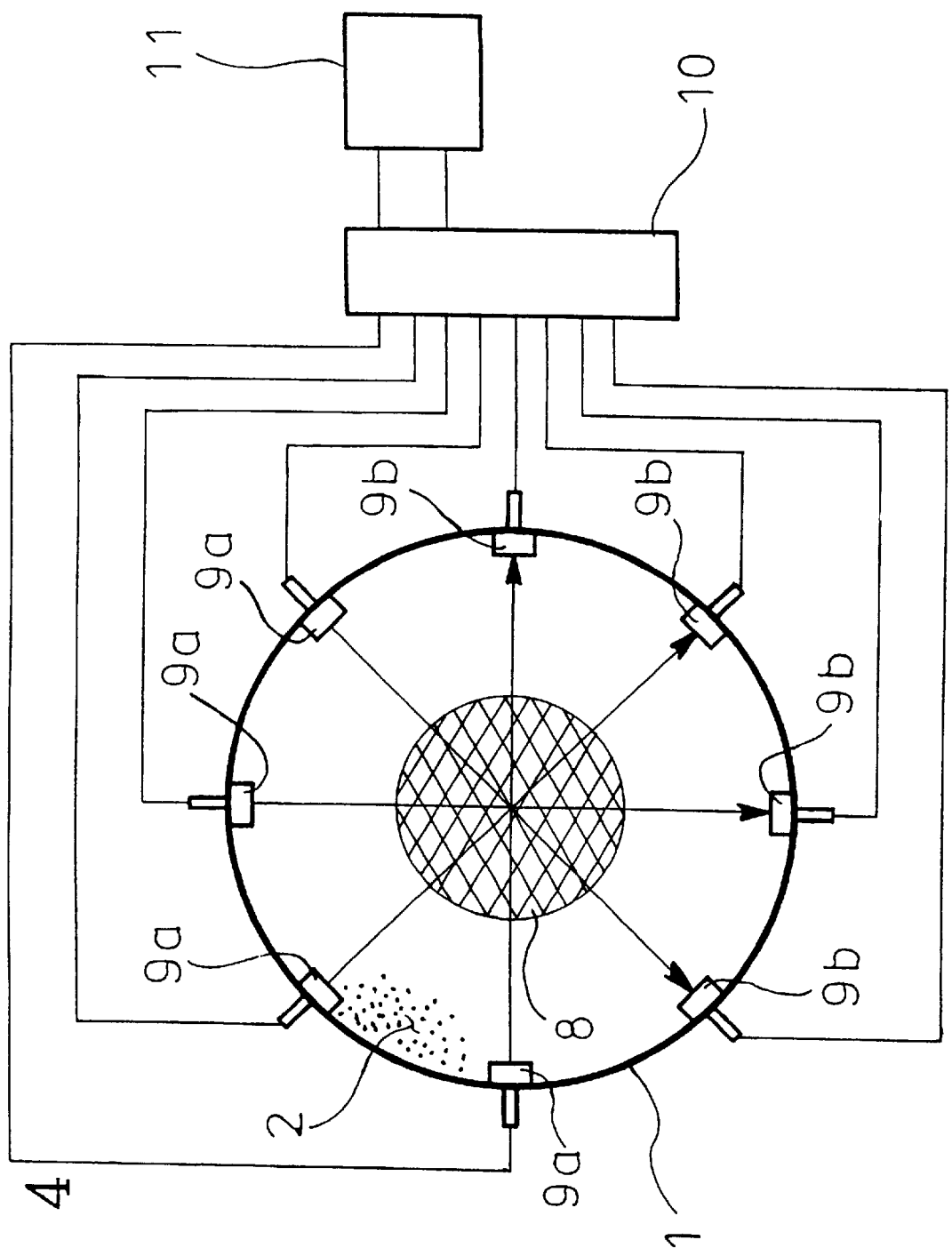
FIG. 4 is a view looking in the direction of arrows IV—IV in FIG. 3.

FIGS. 3 and 4 represent another embodiment of the invention. In this embodiment, a water-cooled structure is not adopted for the furnace body 1, and the inner wall of the furnace body 1 may be decreased in temperature merely by cooling effect of natural air-cooling.

Particularly, FIG. 3 shows specific means for maintaining the inner space of the furnace body 1 to nitrogen, argon or other inert gas atmosphere. The furnace body 1 has, at its bottom, exhaust and inert gas pipes 1a and 1b leading to a vacuum pump (not shown) and a gas supply source (not shown), respectively. Exhaust through the exhaust pipe 1a and introduction of the inert gas through the inert gas pipe 1b may convert the inner space of the furnace body 1 into the inert gas atmosphere.

Furthermore, arranged upstream of the screw conveyor 3 for charge of the carbon powder 2 through the inlet 4 are ball valves 12 and 13 serving as dual baffle means. Arranged in a space defined by the ball valves 12 and 13 is an intermediate chamber 14 which has exhaust and inert gas pipes 14a and 14b to convert the inner atmosphere into nitrogen, argon or other inert gas atmosphere.

More specifically, when the carbon powder 2 is to be charged through the inlet 4 into the furnace body, firstly the carbon powder 2 is charged into the intermediate chamber 14 with the upper and lower ball valves 13 and 12 being opened and closed, respectively. Then, the upper ball valve 13 is closed. The chamber 14 is subjected to a vacuum through the pipe 14a and inert gas such as nitrogen or argon gas is introduced through the pipe 14b to convert the chamber 14 into the inert gas atmosphere. The lower ball valve 12 is then opened to introduce the carbon powder 2 from the chamber 14 to an entry side of the screw conveyor 3. Thus, the carbon powder 2 can be charged into the furnace body 1 without intermingling with external air.

On the other hand, arranged downstream of the screw conveyor 6 for collection of the graphite powder 5 through the collecting port 7 are ball valves 15 and 16 serving as dual baffle meant. Arranged in a space defined by the ball valves 15 and 16 is an intermediate chamber 17 which has exhaust and inert gas pipes 17a and 17b to convert the inner atmosphere into the inert gas atmosphere.

More specifically, when the graphite powder 5 is to be collected through the collecting port 7, the chamber 17 is subjected to a vacuum through the pipe 17a with the ball valves 15 and 16 being closed. Nitrogen, argon or other inert gas is introduced through the pipe 17b to convert the space inside the intermediate chamber 17 into the inert gas atmosphere. Then, the upper ball valve 15 is opened to displace the graphite powder 5 into the chamber 17, and the upper ball valve 15 is closed. Then, the lower ball valve 16 is opened. Thus, the graphite powder 5 can be collected without intrusion of external air into the furnace body 1.

In the figure, reference numeral 18 represents a gas discharge pipe which is connected to the top of the furnace body 1 and is used to draw internal gas such as methane, carbon monoxide or carbon dioxide generated from the carbon powder 2 through heating at high temperature.

In the graphitizing electric furnace with the above arrangement, the carbon powder 2 is charged in the furnace body 1 through the inlet 4 and the power supply 11 is connected to the respective pairs of electrodes 9a and 9b one after another via the current controller 10 at different timing. Then, the graphitizing area 8 has higher current density than that of the surrounding carbon powder 2 and therefore has increased heating value by Joule's heat. On the other hand, temperature near the wall of the furnace body 1 is maintained at a sufficiently low value by natural air-cooling. As a result, the carbon powder 2 in the furnace body 1 only at the graphitizing area 8 is heated to high temperature and is graphitized. Then, effects similar to those of the embodiment shown in FIGS. 1 and 2 can be attained.

In any of the embodiments shown in FIGS. 1 to 4, a plurality of pairs of electrodes 9a and 9b are arranged inside the furnace body 1 opposite the graphitizing area 8 and electric energization occurs of the respective pairs of electrodes 9a and 9b one after another with different timing. In this respect, the graphitizing area 8 has higher current density than that of the surrounding carbon powder and therefore has an increased heating value by Joule's heat, so that only the graphitizing area 8 can be locally and effectively heated to high temperature and the furnace body 1 can be made compact in size. Use of the plurality of pairs of electrodes 9a and 9b is not a requisite; for example, a single pair of laterally extending relatively elongate electrodes 9a and 9b may be arranged in the furnace body 1, which has rectangular cross-section, opposite the graphitizing area 8. Even arrangement of such one pair of electrodes 9a and 9b enables only the graphitizing area 8 to be heated to a high temperature because of the cooling effect from the furnace wall and of the low volume resistivity of the graphitized powder.

More specifically, when the furnace body 1 with the carbon powder 2 being charged is filled with nitrogen, argon or other inert gas. The heat transfer coefficient of the inner wall of the furnace body is increased to substantially decrease the temperature on and adjacent to the inner wall of the furnace body 1 even by the cooling effect of natural air-cooling. On the other hand, heat transfer coefficient between particles of the carbon powder 2 is low so that the high-temperature graphitizing area 8 is locally formed at the core of the furnace body due to heat insulating effect of the carbon powder 2 surrounding the graphitizing area 8. Attainment of such cooling and heat insulating effects to full extent will enable continuous graphitization of the carbon powder 2 even in the case of only one pair of electrodes 9a and 9b.

It is to be understood that the graphitizing electric furnace according to the invention is not limited to the above embodiments and that various changes and modifications may be made without departing from the spirit and the scope of the invention. For example, the carbon powder inlet and the graphite powder collecting port may be oppositely arranged in any direction other than vertical. The barrel of the furnace body may be designed in a shape other than that shown in the figures, e.g., it may be designed to be polygonally or spherically shaped. The electrodes may be arranged oppositely three-dimensionally with respect to the graphitizing area with the respective pairs of electrodes being on different planes. Further, the inner space of the furnace body may be subjected to a vacuum instead of forms the inert gas atmosphere. In this case, the intermediate chambers defined by the dual baffle means respectively on the carbon powder inlet and on the graphite powder collecting port may be also subjected to a vacuum for charge of the carbon powder and for collection of the graphite powder.

What is claimed is:

1. A graphitizing electric furnace, comprising:
   a furnace body having a cylindrical barrel,
   a carbon powder inlet arranged centrally at a top portion of the furnace body,
   a graphite powder collecting port arranged centrally on a bottom of the furnace body,
   a plurality of pairs of electrodes arranged on an inner wall of the furnace body such that respective pairs of electrodes are arranged diametrically opposite one another at a barrel portion of the furnace body and with respect to a graphitizing area located at an intermediate position between said inlet and said collecting port, and
   a current controller for connecting the respective pairs of electrodes to a power supply one after another with different timing.

2. A furnace according to claim 1, wherein the furnace body comprises water-cooled structure.

3. A furnace according to claims 1 or 2 further comprising dual baffles on each of the carbon powder inlet and the graphite powder collecting port to define intermediate chambers which respectively form an inert gas atmosphere and a vacuum.

* * * * *